Aug. 19, 1958

M. L. SENSENIG 2,847,753

JIG STRIPPING DOLLY

Filed Oct. 5, 1953

INVENTOR
Miles L. Sensenig
By Richard E. Babcock Jr.
ATTORNEY

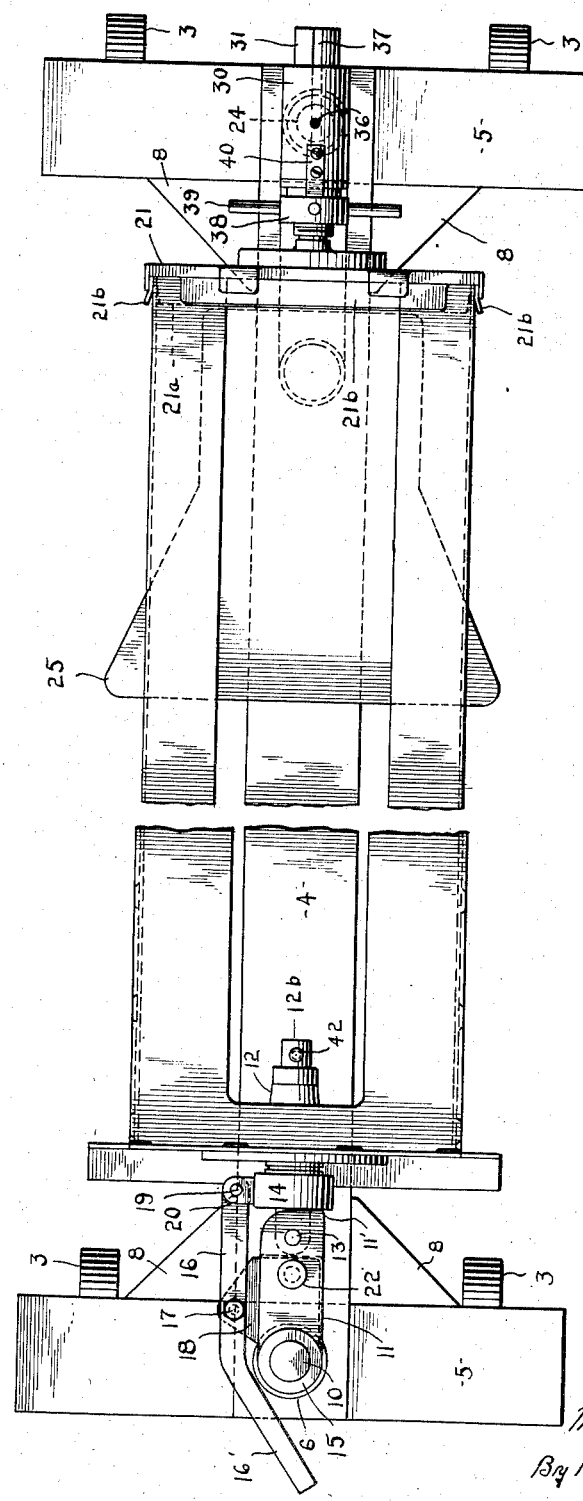

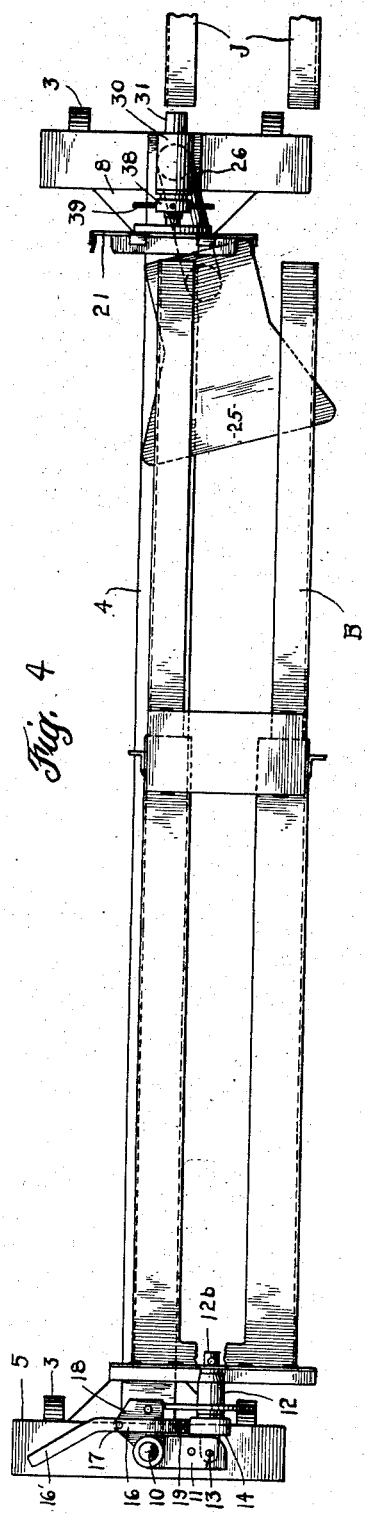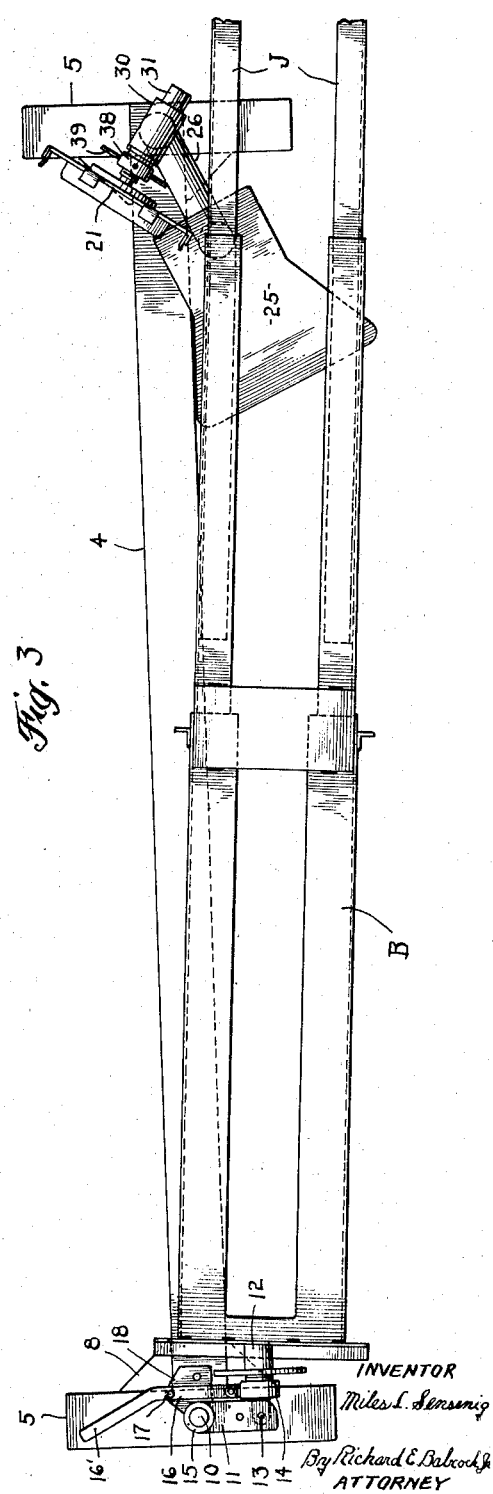

United States Patent Office

2,847,753
Patented Aug. 19, 1958

2,847,753

JIG STRIPPING DOLLY

Miles L. Sensenig, Lancaster, Pa., assignor, by mesne assignments, to Sperry Rand Corporation, New Holland, Pa., a corporation of Delaware Application October 5, 1953, Serial No. 384,002

9 Claims. (Cl. 29—288)

This invention relates to a dolly especially adapted for use in stripping tubular bale casings or other heavy tubular articles from the jigs on which said articles are formed and/or for supporting said articles by their opposite ends to permit ready accessibility to said articles throughout their entire lengths, whereby attachments or parts may be affixed at various locations thereon, or internal welding operations may be performed through openings in the side walls of said articles.

It is a primary object of the invention to provide such a dolly which is supported for universal ambulatory movement over a horizontal surface, and provided with a pair of longitudinally adjustable work supports adapted to engage and support the opposite ends of a bale casing or other tubular article. The arrangement is such that the dolly may be positioned with its forward work support in alignment with the free forward end of a cantilever type jig and in operative engagement with a bale casing formed on said jig while the other or rear work support is laterally offset to one side of the jig and bale casing to avoid interference therewith as the dolly is moved forward longitudinally of the jig in the direction of its free end to strip the bale case from the jig.

An important feature of the invention consists in the provision of a laterally adjustable auxiliary work support or shelf carried by the dolly and positionable to engage and support the rear end of the bale casing as the latter is completely removed in a lengthwise direction from its supporting jig and while the rear work support is still in its laterally offset position to one side of the jig. This auxiliary support is then laterally adjustable to move its associated end of the tubular casing into substantial endwise registry with the rear work support.

More specifically, the invention includes the concept of mounting both the rear work support and the auxiliary support for independent lateral swinging movement about a common vertical axis, whereby the rear support may be swung laterally away from the bale case to avoid interference therewith while the auxiliary support is projected laterally in an opposite direction to extend beneath the bale case as it is stripped. Thus, when the rear end of the bale case is received by the auxiliary support following completion of the stripping it may be moved laterally by swinging of the auxiliary support and positioned in registry with the rear work support which is independently swingable to facilitate lining it up with the bale casing.

A further feature consists in adapting the work supports to carry the base casing or other tubular article for rotation about its longitudinal axis, the auxiliary work support being adjustable transversely to the bale casing to an out-of-the-way position to avoid interference with this rotary movement.

A still further feature consists in pivotally supporting the forward work support on a laterally swingable toggle arm for longitudinal adjustment toward or away from the rear work support whereby these supports may be brought into operative endwise supporting engagement with the work piece. As a refinement of this feature a suitable linkage may be associated with the forward work support to maintain same at all times in a longitudinally directed operative position.

It is also an object of the invention to provide means for coupling the bale casing to the forward work support for longitudinal movement therewith so that the longitudinal ambulatory movement of the dolly, while said forward work support is in operative engagement with the forward end of the bale casing, may be wholly or partially relied upon to strip the tubular work piece or bale casing from its supporting jig.

Also, if desired, a suitable threaded means may be provided for adjusting the rear work support longitudinally of the dolly to thus adapt the dolly for cooperation with bale casings or other articles of varying lengths.

The foregoing and other incidental objects and advantages are attained by the preferred embodiment of the invention illustrated in the accompanying drawings in which:

Figure 2 is a plan view of the structure shown in Figure 1.

Figure 3 is a plan view on a much smaller scale than Figures 1 and 2 showing the several parts of the dolly in the positions which they assume just prior to and during the stripping of the bale case from the welding jig, the latter being illustrated fragmentarily.

Figure 4 is a plan view showing the dolly in the position it assumes when the bale case is fully stripped from the welding jig and in which the rear end portion of the bale case is resting on the auxiliary support or shelf of the dolly.

Figure 1:
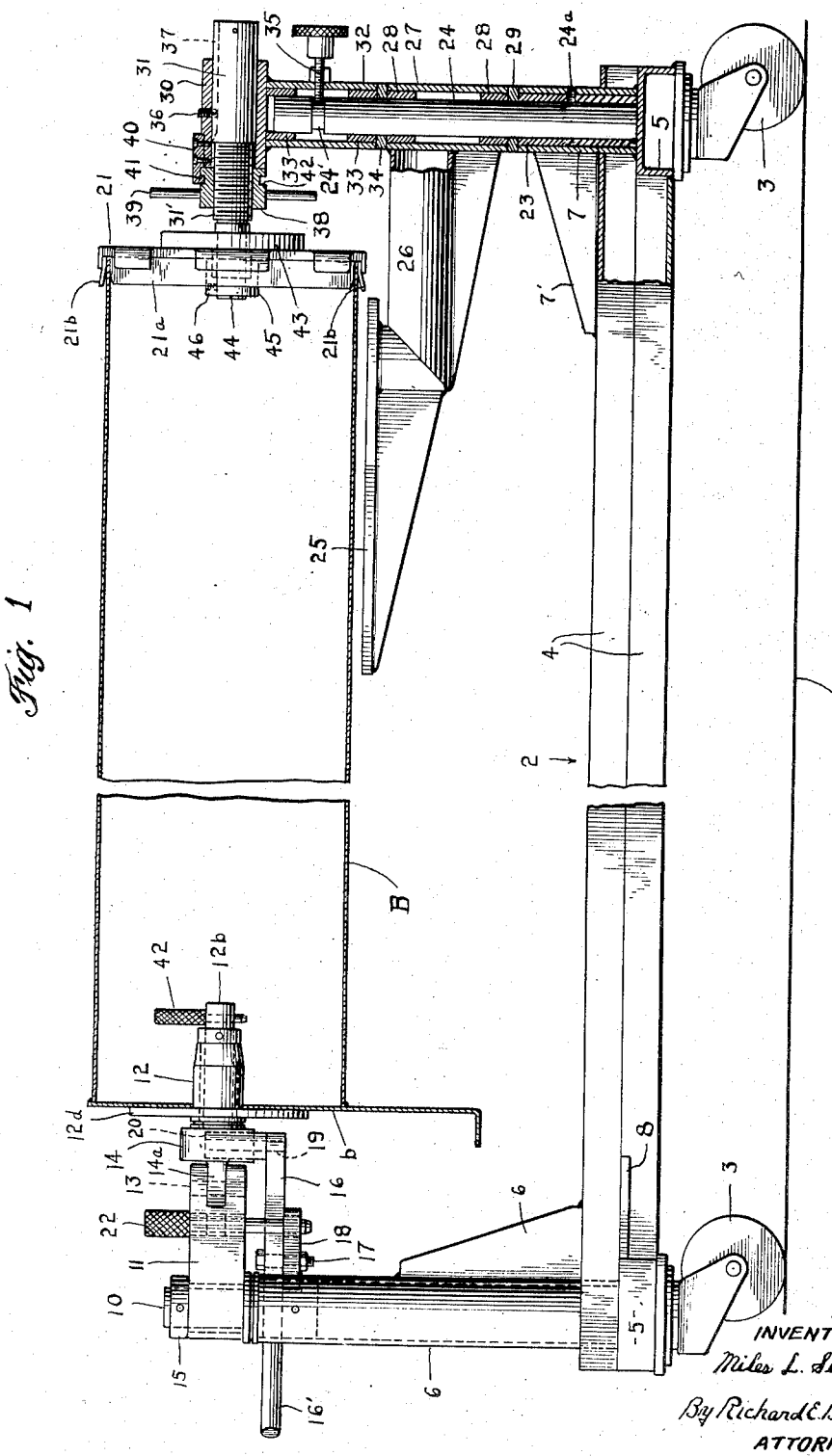
Figure 1 is a sectional elevational view of the dolly or carriage of the invention, illustrating the manner in which it supports a bale casing, the view being broken away to condense the figure and the righthand end portion of the dolly and the bale casing in its entirety being shown in section.

Referring now in detail to the accompanying drawings and referring first to Figures 1 and 2, the dolly of the invention comprises a rigid frame generally designated 2 which is suitably supported as by means of the caster wheels 3 for universal horizontal movement over the horizontal supporting surface S shown in Figure 1. The frame 2 in the instant embodiment is formed of a pair of channel irons 4—4 welded together in symmetrical relation to form a composite longitudinal frame element of rectangular cross section. Each of the channel iron frame numbers 5—5 extending transversely of the numbers 4—4 at the opposite longitudinal ends or extremities of the frame supports a pair of laterally spaced caster wheels 3. A pair of relatively fixed longitudinally spaced vertical standards 6 and 7, respectively, at the front and rear ends of the frame 2 exemplifies one convenient means for carrying the front and rear work supports hereinafter referred to and their associated parts.

In order to lend rigidity to the structure thus formed, the standards 6 and 7, respectively, may be braced against longitudinal deflection by means of the reinforcing webs 6' and 7'. Similarly reinforcing webs 8 may be welded between the lower member 4 and each of the transverse frame members 5 as shown.

Fixed in and projecting upwardly from the upper end of the tubular standard 6 is a pivot 10 on which is journalled a rigid toggle arm 11, the free end of which pivotally supports the forward work support or head 12 for lateral swinging movement about the axis of the pivot pin 13. It will be seen that the free end of the toggle arm 11 is slotted horizontally to receive the shank 14a of a bracket 14 which carries the forward support 12, and the pivot pin or pintle 13 extends vertically across the slot thus formed and through the shank 14a. A collar 15 fixed on the pivot 10 as shown prevents upward displacement of the arm 11 and work support 12.

By virtue of the pivotal connection 13 of its supporting bracket 14 to the toggle arm 11, the work support 12 may obviously be made to assume a longitudinally directed position for proper engagement with the bale casing or other work piece B as shown in Figures 3 and 4, even when its supporting toggle arm 11 is swung transversely to the dolly to position the support 12 in a longitudinally retracted and laterally offset position.

Preferably a suitable linkage arrangement is provided for maintaining the support 12 in its operative longitudinally directed position throughout the entire range of swinging movement of the toggle arm 11. To this end a link 16 extending parallel to the toggle arm 11 is pivotally connected at 17 to a bracket 18 fixed on the standard 6 and is pivotally connected at 19 to an ear 20 constituting a laterally projecting portion of the bracket 14, the link 16 being spaced horizontally from the arm 11. The arrangement is such that the arm 11, link 16, bracket 14, and the standard 6 (of which the bracket 18 is a part) define a parallelogram linkage. A forward extension 16' of the link 16 may conveniently function as an operating handle whereby the arm 11 and support 12 may be swung horizontally about the pivot 10, the aforementioned parallelogram linkage meanwhile maintaining the support 12 in a longitudinally directed position at all times. It will be seen that when the arm 11 is swung transversely of the dolly as in Figures 3 and 4 the support 12 will be retracted longitudinally away from the rear work support 21 of the dolly to permit the reception or removal of a bale casing or other work piece to or from the dolly. On the other hand, when the toggle arm 11 is swung to a longitudinally directed position as in Figures 1 and 2, the work support 12 will be projected toward the support 21 to the fullest extent possible whereby the supports 12 and 21 may operatively engage the opposite ends of the work piece B to support same on the dolly. Suitable stop means for preventing swinging of the toggle arm 11 in a counterclockwise direction in Figure 2 past its longitudinally extending position may comprise the corner 11' of this toggle arm which is disposed to abut against the adjacent face of the bracket 14 which carries support 12. In order to positively retain the arm 11 in this longitudinal position and thus retain the support 12 in its longitudinally projected operative position, there may be provided a locking pin 22 adapted for insertion through vertically registering bores in the arm 11 and bracket 18, respectively.

Considering the invention from its broader aspects, it will be readily apparent that the standard 6 and toggle linkage including the toggle arm 11 merely exemplify one possible means of mounting the support 12 for longitudinal adjustment toward or away from the support 21 and for maintaining support 12 in its operative longitudinally directed position at all times.

In the preferred embodiment the rearmost standard 7 which is of tubular construction as shown in Figure 1, is provided with an internal sleeve 23 through which is press fitted the lower end of a pivot post or pintle 24 by means of which the parts hereinafter described are pivotally associated with the standard 7. A set screw 24a threaded through the standard 7 and sleeve 23 into endwise engagement with the post 24 firmly secures the post against either rotational or axial movement.

One of such parts comprises an auxiliary support preferably in the form of a horizontal shelf 25 supported by an arm 26 which terminates at one end in a sleeve 27 journalled about the pivot post 24. Preferably bushings 28 are interposed between the sleeve 27 and pivot post 24 to function as bearings and the lower end of the sleeve 27 rests on a washer 29 which is coaxial with the post 24 and supported on the upper end of the standard 7 to function in the manner of a thrust bearing for the sleeve 27. It will thus be seen that the arm 26 and shelf 25 carried thereby are freely horizontally swingable about the post 24.

The rear work support or head 21 is carried by a horizontally directed arm defined jointly by the members 30 and 31 in the present embodiment, and this arm 30—31, in turn, is supported by a vertical sleeve 32 on the arm 31 for horizontal swinging movement about the pivot post 24, bushings or bearings 33 being interposed between the sleeve 32 and the post 24 and a washer 34 being disposed about the post 24 between the two sleeves 27 and 32 to serve as a thrust bearing between these sleeves permitting them to rotate freely and independently of each other. When desired, the rear work support 21 may be secured against rotation on the post 24 by means of a screw 35 threaded through the side of sleeve 32 to have its end projected into an annular slot or groove 24' of the post 24.

Preferably the work support 21 is adjustable longitudinally toward or away from the forward support 12 in order to adapt the said supports 12 and 21 for operative engagement with bale cases or other articles of varying lengths. Accordingly, the arm 30 is formed with a horizontal bore therethrough which slideably receives the arm 31. Suitable means for preventing rotation of the member 31 within member 30 may comprise a set screw 36 threaded through the member 30 with its inner end slideably received in a longitudinal keyway 37 in member 31. On the screw threaded forward end 31' of the member 30 is operatively disposed an exteriorly cylindrical nut 38 preferably provided with radial handles 39 by which it may be manually rotated. Axial displacement of the nut 38 relative to the sleeve 30 is prevented by means of a bracket 40 fixed on the sleeve 30 and having a detent 41 received in an annular groove 42 in nut 38. Thus it will be seen that as the nut 38 is rotated by means of its operating handles 39, the threaded member 31, which is restrained against rotation by the set screw 36, will be moved in one direction or the other through the bore of the sleeve 30 to horizontally adjust the position of the support 21 as desired.

Preferably the work supports 12 and 21 are arranged to support a tubular work piece or work piece of substantially closed cross-section, as exemplified by the bale casing B, for rotation about its longitudinal axis, whereby the work piece B may be manually rotated as desired to position any side thereof for ready accessibility by the workman.

Accordingly, in the preferred embodiment both of the work heads or work supports 12 and 21 are mounted for rotation with the bale casing or other tubular article which they are adapted to support. Obviously, these supports 12 and 21 may be adapted in various ways for operative engagement with the ends of the work piece B depending on the configuration of the particular work piece B. In the embodiment shown, the work piece B is open at its rear end and is provided at its forward end with a centrally apertured end plate b. In order to adapt the work support 12 for cooperation with this end plate b, this support 12 in the instant embodiment takes the form of a hollow mandrel rotatable on a spindle 12b fixed to and projecting horizontally from the pivotally supported bracket 14. A radial flange 12d preferably integral with the hollow mandrel 12 serves to abut against the forward end b of the work piece B to limit the axial movement thereof on the mandrel 12. In order to prevent the work piece B from slipping off of the mandrel 12 as the dolly is rolled forwardly on its caster wheels 3 to remove or strip the work piece B in an endwise direction from the jig on which it is formed (said jig being shown fragmentarily and designated by the reference character J in Figures 3 and 4) a suitable retainer pin 42 may be disposed diametrically through a bore in the free end portion of the spindle 12b.

The rear work support 21 which is adapted to engage and support the open rear end of the work piece B is mounted on a central hub 43 for free rotation about a pintle 44 which may constitute an integral axial extension of the arm 31. The pintle 44 is of reduced diameter relative to the screw threaded portion 31' of the arm 31, and the hub 43 of the work support 21 is maintained against axial displacement on the pintle 44 by the annular shoulder at the juncture of the threaded portion 31' with the relatively reduced diametral pintle 44 and by a collar 46 secured on the pintle 44 as shown on the opposite side of the hub 43 from the screw threaded portion 31'. The outer periphery of the member 21 is of rectangular configuration in conformity with the cross-section of the bale casing or work piece B and includes an axially projecting forwardly tapered portion 21a for reception interiorly of the end of the bale casing B. Also, if desired, a plurality of forwardly diverging tongues 21b may be provided on the work support 21 for exterior wedging engagement with the end portions of the bale casing B, the combined wedging actions of the tapered inner portion 21a and the tongues 21b serving to accurately center the end of the work piece B with regard to the rotational axis 4 of its support 21 as the work piece B moves longitudinally or axially into operative engagement with the support 21.

In the operation of the invention after a bale casing B or other article of closed cross-section has been formed on a jig having a horizontally presented free end portion represented fragmentarily by the reference character J in Figures 3 and 4, the completed bale casing B is preferably partially manually withdrawn or stripped from its said jig J and positioned thereon substantially as shown in Figure 3, whereupon the dolly is moved to the position of Figure 3. As thus positioned the arm 30—31 is swung laterally away from the bale casing B to avoid interference therewith as the supporting shelf 25 is swung laterally and projected beneath the bale casing B and the jig J. At the same time the forward support 12 will have been longitudinally retracted by swinging of its toggle arm 11 to a lateral position as indicated in Figure 3, in which position the spindle 12b of the forward support 12 is off-set laterally to one side of the longitudinal axis of the dolly to facilitate its reception in the apertured end plate b of the casing B. As the dolly is moved rearwardly to assume the position of Figure 3 the mandrel is inserted through the aperture of the end plate b and thereafter the retaining pin 42 is positioned as shown in Figure 1 to prevent the mandrel 12 and its supporting pintle 12b from being withdrawn from the end plate b during subsequent forward stripping movement of the dolly and the bale casing B.

Thereupon the dolly may be moved longitudinally forwardly parallel to the jig J to completely strip or remove the casing B from the jig, whereupon the rear end of the casing B will be received upon the auxiliary support or shelf which projects therebeneath and maintained at the proper level for subsequent reception in the support 21.

The bale casing B is indicated in Figure 4 in the position which it assumes immediately following its removal from the jig J and while its rear end is supported on the shelf 25. Following such removal of the bale casing B and while the latter is supported on shelf 25 the rear work support 21 is swung horizontally from the position of Figure 3 back into longitudinal alignment with the major longitudinal axis of the dolly as shown in Figure 4 in readiness for reception of the rear end of the work piece or bale casing B. The auxiliary support or shelf 25 is then swung laterally into substantial longitudinal alignment with the major axis of the dolly to the position illustrated in Figure 2 to thereby position the rear end of the casing B in substantial registry with the support 21. In this connection it will be noted that the shelf 25 supports casing B substantially at the level of the support 21. Following this, the actuating handle 16' for the forward work support 12 is swung to bring the said work support into longitudinal alignment with the work support 21. The resulting longitudinal component of movement of the forward work support 12 and engagement of the end b of the work piece by the radial flange 12d of the support 12 moves the bale case B longitudinally over the supporting shelf 25 and into operative engagement with the then registering rear work support 21. It will be noted that the shelf 25 maintains the rear end of the casing B at substantially the proper height for reception in the support 21. In the event the rear end of the baler should be slightly out of either vertical or horizontal registry with the support 21 the ensuing wedging action of the forwardly converging interior portion 21a and the forwardly diverging exterior tongues 21b will serve to automatically center said rear end of the casing B relative to the support 21 as an incident to the longitudinal movement and seating of the casing B in the support 21. Obviously, by virtue of the toggle action of the arm 11 in conjunction with its pivotally associated work support 12, the manual power required to cause the necessary extent of endwise movement of the bale casing B toward the rear support 21 is afforded a very substantial mechanical advantage, particularly at the latter or final stages of such movement.

When the toggle arm 11 has been swung to the position of longitudinal alignment illustrated in Figure 2, the retainer pin 22 may be inserted downwardly through the toggle arm 11 and bracket 18 through the then registering bores of these members to prevent longitudinal retraction of the work support 12. Horizontal swinging of the work support 21 about its pivot post 24 at this time will normally be prevented by the engagement of support 21 with the squared end of casing B, although if desired, the set screw 35 of Figure 1 may be rotated at this time into endwise thrusting engagement with the pivot post 24 to exert a locking action. Subsequently the supporting shelf 25 may be swung from under the bale casing B to avoid interference with its free rotation.

In this application I have shown and described only the preferred embodiment of my invention simply by way of illustration of the preferred mode contemplated by me of carrying out the invention. However, I recognize that the invention is capable of various modifications and that its several details may be changed in various respects, all without departing from the invention. Accordingly, the drawings and description herein are to be considered as merely illustrative in nature and not as exclusive.

Having thus described the invention, I claim:

1. A bale case supporting carriage comprising a mobile frame, said frame including a pair of relatively fixed longitudinally spaced vertical standards, rigid arms laterally swingable on the respective standards, normally longitudinally directed and longitudinally aligned work supports carried by the respective arms, one of said work supports being pivoted on its said arm for relative lateral swinging movement, linkage means connected between said support and the frame to constantly maintain said support in its longitudinally directed position during swinging of its arm to move said support longitudinally relative to the other said support, and an auxiliary work positioning shelf laterally swingable on said frame beneath the other work support.

2. The combination of claim 1 including means for locking said arms in longitudinally extending position.

3. The combination of claim 1 in which said supports are rotatably carried by their respective arms.

4. The combination of claim 3 including threaded means for adjusting one of said supports along its rotational axis.

5. A bale case supporting carriage comprising a mobile frame, rigid arms swingable in a common horizontal plane about relatively longitudinally spaced generally vertical axes on the frame, normally longitudinally directed and longitudinally aligned work supports carried by the respective arms, one of said work supports being pivoted on its said arm for relative horizontal swinging movement, and linkage means connected between said one support and the frame to constantly maintain said one support in its longitudinally directed position during swinging of its said arm.

6. A bale case supporting carriage comprising a mobile frame, said frame including a pair of relatively fixed longitudinally spaced vertical standards, rigid arms horizontally swingable on the respective standards, normally longitudinally directed and longitudinally aligned work supports carried by the respective arms, one of said work supports being pivoted on its said arm for relative horizontal swinging movement, linkage means connected between said one support and the frame to constantly maintain said one support in its longitudinally directed position during swinging of its arm, and means for locking said arm in longitudinally extended position.

7. A bale case supporting carriage comprising a mobile frame, rigid arms horizontally swingable about relatively longitudinally spaced axes on said frame, normally longitudinally directed and longitudinally aligned work supports carried by the respective arms, one of said work supports being pivoted on its said arm for relative horizontal swinging movement, linkage means connected between said one support and the frame to constantly maintain said one support in its longitudinally directed position during swinging of its respective arm, and means for locking its said arm in longitudinally extending position.

8. A device for supporting a work piece comprising a pair of cooperative, relatively spaced work holders for suspending a work piece between them, a frame, separate means for mounting said work holders on said frame, the means for mounting one of said work holders comprising a toggle arm swingably supported on said frame, means pivotally connecting said one holder to said arm, a link arm pivoted on said frame, said link arm extending generally parallel to said toggle arm, means pivotally connecting said link arm to said one work holder, the axes of all of said pivots being parallel, said link arm when pivoted relative to said frame operating through said one work holder to pivot said toggle arm relative to the frame and to pivot the one work holder relative to said toggle arm, the disposition of the several pivots being such that the direction in which said one work holder is facing remains the same regardless of the pivotal movement of said toggle arm.

9. A device for supporting a work piece comprising a frame including a pair of fixed, relatively spaced vertically extending standards, a pair of rigid arms, one mounted on each of said standards for lateral swinging movement about the axis of its standard, a pair of work holders one mounted on each of said arms, means for detachably connecting a work piece to said work holders whereby the holders may suspend the work piece between themselves, one of said work holders being pivoted to its associated arm for relative lateral swinging movement, means for pivoting said one holder relative to its arm and for simultaneously pivoting that arm relative to its supporting standard, the pivoting of said arm relative to such standard being proportionate to the pivoting of said one work holder relative to its arm whereby the direction in which the one holder is facing remains the same despite the pivoting of the holder, and an auxiliary work positioning shelf swingable on the other of said standards beneath the other of said work supports, said shelf projecting laterally beyond said one support to extend beneath a work piece disposed between the work holders.

References Cited in the file of this patent

UNITED STATES PATENTS

| | | |
|---|---|---|
| 142,263 | Morrison | Aug. 26, 1873 |
| 307,178 | Carter | Oct. 28, 1884 |
| 593,139 | Thomas | Nov. 2, 1897 |
| 935,208 | Humphries | Sept. 28, 1909 |
| 964,640 | Goldschmidt et al. | July 19, 1910 |
| 1,084,130 | Cargin | Jan. 13, 1914 |
| 1,166,243 | Norton et al. | Dec. 28, 1915 |
| 1,442,267 | Gross et al. | Jan. 16, 1923 |
| 1,600,835 | Manley | Sept. 21, 1926 |
| 1,601,928 | Tobey | Oct. 5, 1926 |
| 1,953,814 | McDevitt | Apr. 3, 1934 |
| 2,001,955 | Evinrude | May 21, 1935 |

FOREIGN PATENTS

| | | |
|---|---|---|
| 481,558 | Great Britain | Mar. 7, 1938 |